Figure 1:
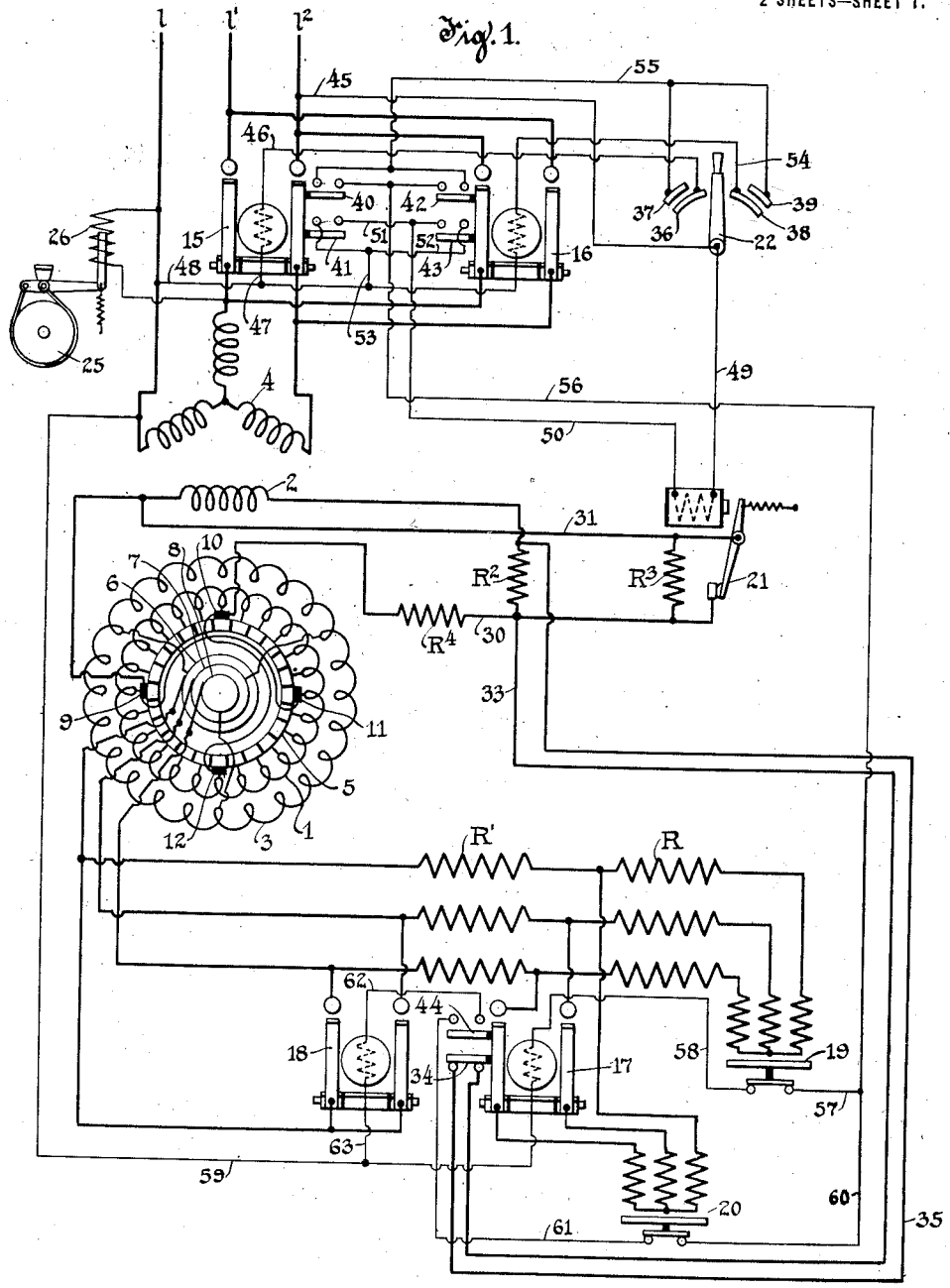

A. SIMON.
CONTROLLER FOR DYNAMO ELECTRIC MACHINES.
APPLICATION FILED JUNE 5, 1915.

1,278,770.

Patented Sept. 10, 1918.
2 SHEETS—SHEET 1.

Inventor
Arthur Simon
By Frank H Hubbard
Attorney

A. SIMON.
CONTROLLER FOR DYNAMO ELECTRIC MACHINES.
APPLICATION FILED JUNE 5, 1915.

1,278,770.

Patented Sept. 10, 1918.
2 SHEETS—SHEET 2.

Inventor
Arthur Simon
By Frank H Hubbard
Attorney

UNITED STATES PATENT OFFICE.

ARTHUR SIMON, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR DYNAMO-ELECTRIC MACHINES.

1,278,770.  Specification of Letters Patent.  Patented Sept. 10, 1918.

Application filed June 5, 1915. Serial No. 32,298.

*To all whom it may concern:*

Be it known that I, ARTHUR SIMON, a citizen of the United States, residing at Milwaukee, in the county of Milwaukee and State of Wisconsin, have invented new and useful Improvements in Controllers for Dynamo-Electric Machines, of which the following is a full, clear, concise, and exact description, reference being had to the accompanying drawing, forming a part of this specification.

This invention relates to controllers for dynamo electric machines and more particularly for the proposed type of machine consisting essentially of a direct current dynamo having an alternating current stator and rotor whereby it is driven as an induction motor.

In my prior application, Serial No. 30,016, filed May 24, 1915, there is disclosed a method of control for such a machine whereby the same may be advantageously employed for mechanical duty, especially in hoist service, and this invention has among its objects to provide improved means for effecting control in accordance with such method.

A further object is to provide a controller including both alternating and direct current regulating means which are so associated as to insure their operation in a definite relation.

A still further object is to provide a controller wherein the operation of both the alternating and direct current regulating means is governed by the electrical conditions in the controlled machine.

Other objects and advantages of the invention will hereinafter appear.

The accompanying drawings illustrate diagrammatically a number of possible embodiments of the invention and the same will now be described, it being understood that the invention might be embodied in other forms falling within the scope of the appended claims.

Figure 2:
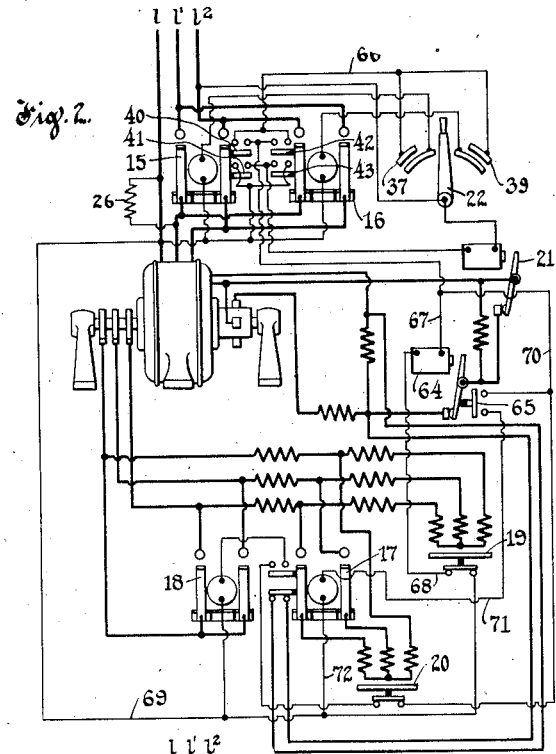
Figure 4:
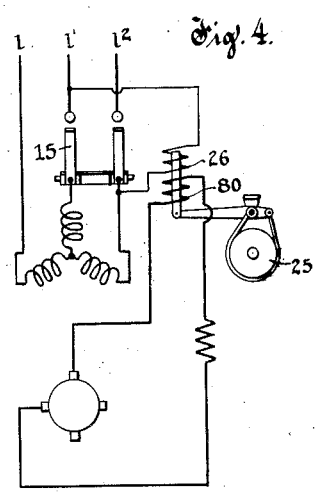
Figure 3:
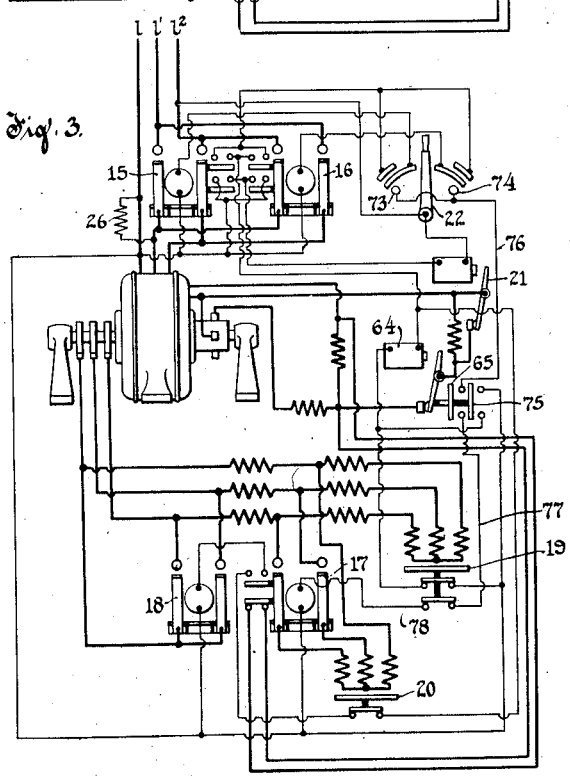
Figure 5:
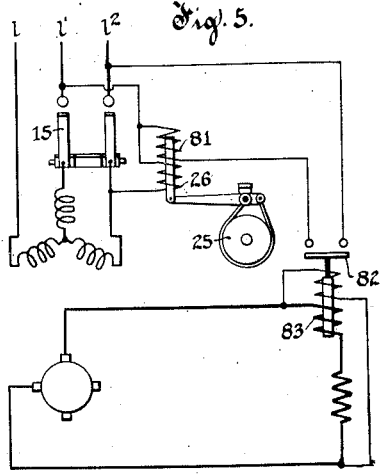

In the drawings,

Figure 1 diagrammatically illustrates a two speed controller particularly adapted for elevator service;

Fig. 2 diagrammatically illustrates a modification of the controller shown in Fig. 1 whereby additional direct current control is obtained;

Fig. 3 diagrammatically illustrates a modification of the controller shown in Fig. 1 to provide for three optional speeds, and Figs. 4 and 5 diagrammatically illustrate modifications of the mechanical brake controlling means shown in Fig. 1.

Referring to Fig. 1, the controlled machine is diagrammatically illustrated as provided with a direct current armature winding 1, a direct current field winding 2, an alternating current rotor winding 3 and a three-phase alternating current stator winding 4. As typical of this type of machine it will be assumed that the direct current field has four poles while the alternating current field has two poles. The rotating part of the machine is provided with a commutator 5 for the direct current winding 1 and with slip rings 6, 7 and 8 for the alternating current rotor winding 3. As will be understood the rotor windings 1 and 3 might be combined, if desired. Also, it will be understood, that the field produced by the stator winding 4 is superimposed upon that produced by the direct current field winding 2 and that the alternating current windings effect operation of the machine as an induction motor, while the direct current windings produce a direct current which is taken off of the commutator at brushes 9, 10, 11 and 12. Thus the machine, although primarily proposed as a converter, may also be advantageously employed for mechanical driving purposes by regulation thereof in the manner set forth in my prior application aforesaid. Briefly describing the method disclosed in said application, the same provides for speed regulation by regulation of the alternating current circuit or regulation of the direct current load, or both. Also, said method provides for regulation of the direct current load on the machine by regulating the direct current field or armature, or both.

The controller illustrated in Fig. 1 provides for both A. C. and D. C. regulation of the machine. It includes electro-responsive main switches 15 and 16 for controlling the continuity of the stator circuit and the direction of flow of current therethrough, electro-responsive switches 17 and 18 together with relays 19 and 20 for controlling resistances R and R' in the rotor circuit and a resistance $R^2$ in the circuit of field winding 2 and an electro-responsive switch 21 for controlling a resistance $R^3$ in the armature circuit. With the exception of the relays the several switches are all under the control of a master switch 22, and briefly set forth, they function in the following manner. In the first position of the master switch when moved in either direction one of the main switches responds to complete the stator circuit for starting the machine as an induction motor with both sets of resistances included in its rotor circuit. At the same time, switch 21, which is normally closed to short circuit the resistance $R^3$, responds to include said resistance in the armature circuit of the machine. This establishes a predetermined speed and the machine will continue to operate at such speed until the master switch is moved to its next position. When the master switch is so operated it energizes switch 17 but subject to delay by response of relay 19 which is responsive to an excessive current in the rotor circuit. Then when switch 17 responds it short-circuits the resistances R in the rotor circuit and at the same time opens a normally closed short-circuit around the direct current field resistance $R^2$. Still further the switch 17 upon closing energizes switch 18 but subject to delay by response of relay 20 which like relay 19 is responsive to the rotor current. Thus movement of the master switch to its second position directly increases the speed of the machine by exclusion of the rotor resistances and indirectly by weakening the direct current field to thereby lessen the electrical load on the machine. On the other hand, when the master switch is returned to off position it first reinserts the resistances in the rotor circuit, at the same time excluding the direct current field resistance and thereafter disconnects the stator from circuit, at the same time excluding the armature resistance $R^3$. The reinsertion of the rotor resistances directly tends to slow down the machine while the exclusion of the resistance $R^2$ tends to effect a like result by increasing the excitation of the direct current field and in consequence the electrical load on the machine. Then when the machine is disconnected from circuit and resistance $R^3$ is excluded the electrical load on the machine is further increased with a consequent strong braking action thereon to quickly bring the same to rest. Moreover, it will be observed that any variations in the mechanical load on the machine will be reflected in its direct current output with a resultant tendency to compensate therefor.

The controller also includes a mechanical brake 25 having an operating solenoid 26 adapted to be connected across two lines of the alternating current supply circuit $l$, $l'$ and $l^2$ by either of the main switches. Thus whenever the stator circuit of the machine is closed the solenoid 26 will be energized to release the mechanical brake and conversely whenever the machine is disconnected from its supply source said solenoid will be deënergized to allow said brake to set and act in conjunction with the electrodynamic braking action of the machine to quickly bring the load to rest. For overhauling loads it would, of course, be desirable to provide for retention of the mechanical brake in released position after disconnection of the machine from circuit and means for this purpose will be hereinafter described.

More specifically considering power circuits, the stator winding 4 has one terminal connected directly to line $l$ while its remaining two terminals are adapted to be interchangeably connected to lines $l'$ and $l^2$ by switches 15 and 16, these connections being shown in heavy lines and therefore obvious. The slip rings of the rotor are connected to the resistances R and R' in the usual manner and the rotor circuit normally includes the windings of relay 19, there being one winding for each phase of said circuit. When switch 17 responds it short-circuits the resistances R and the windings of relay 19 in the usual manner, at the same time including in circuit the windings of relay 20 in the same manner as the windings of relay 19. Then when the switch 18 responds it short-circuits resistances R' and also the windings of relay 20. The armature circuit of the machine is traceable from the armature brush 10 through a fixed resistance $R^4$, by conductor 30 through switch 21 when closed, (or when open through resistance $R^3$) by conductor 31 to brush 9. As will be understood the fixed resistance $R^4$ is included to prevent complete short-circuiting of the armature. The direct current field winding 2 is connected in shunt with the armature, or more specifically, is connected across conductors 30 and 31 through resistance $R^2$. As before stated, however, the resistance $R^2$ is normally short-circuited, said short-circuit extending from conductor 30 by conductor 33 through normally closed auxiliary contacts 34 associated with accelerating switch 17, by conductor 35 to a point between said resistance and the field winding. The brake solenoid, as will be apparent, has one terminal directly connected to line $l$ and its opposite terminal connected between one terminal of the stator and the switches 15 and 16.

Considering now the control circuits, the same are governed by the master switch 22 which as illustrated comprises a pivoted arm movable in one direction to successively engage contacts 36 and 37 and in an opposite direction to successively engage contacts 38 and 39. Also, the control circuits are in a measure governed by auxiliary contacts 40 and 41 associated with main switch 15, parallel auxiliary contacts 42 and 43 associated with main switch 16 and auxiliary contacts 44 associated with accelerating switch 17, all of said contacts being normally disengaged and being movable into engagement upon response of their respective switches. When the master switch is moved to engage its contact 36 it completes a circuit from line $l^2$ by conductor 45 and 46 through the winding of main switch 15, by conductors 47 and 48 to line $l$. Switch 15 is thereupon energized and upon response its auxiliary contacts 41 complete the circuit of switch 21. This circuit extends from line $l^2$ by conductors 45 and 49 through the winding of said switch, by conductors 50 and 51 through the contacts 41, by conductors 52, 53 and 48 to line $l$. When the master switch is moved in an opposite direction to engage contact 38 it completes circuit from line $l^2$ by conductors 45 and 54, through the winding of main switch 16, to conductor 48 and thence to line $l$. Switch 16 upon responding completes the aforesaid circuit of switch 21 through its auxiliary contacts 43, which as is apparent, are in parallel with contacts 41 of switch 15. When the master switch is moved into engagement with either contact 37 or contact 39 it completes circuit from line $l^2$ to a common conductor 55 and thence through contacts 40 of main switch 15 or the parallel contacts 42 of main switch 16 by conductors 56 and 57 through the contacts of relay 19, by conductor 58 through the winding of accelerating switch 17, by conductor 59 to line $l$. This effects response of switch 17 which in closing completes a circuit from conductor 56 by conductor 60 through contacts of relay 20, by conductor 61 through auxiliary contacts 44 of said switch 17, by conductor 62 through the winding of accelerating switch 18, by conductors 63 and 59 to line $l$. Thus, as above set forth, whenever the master switch is in its first position its effects response of one of the main switches, each of which upon responding effects response of switch 21. Then when the master switch is moved to its second position it energizes the accelerating switch 17 but subject to delay by response of relay 19, while accelerating switch 17 upon responding energizes accelerating switch 18 but subject to delay by response of relay 20. Also, in this connection, it will be noted that inasmuch as the direct current field resistance is under the control of the accelerating switch 17 its inclusion, like the exclusion of the rotor resistances R, will be timed by the relay 19.

Referring now to the modification of the controller shown in Fig. 2, the same embodies an additional control switch 64 to completely interrupt the armature circuit for the second speed. This switch is of the normally closed type and is included in one side of the armature circuit whereby upon energization it will interrupt said circuit. The winding of switch 64 is controlled by the master switch in the same manner as the winding of accelerating switch 17 of Fig. 1, and said switch 64 has auxiliary contacts 65 to control the circuit of said accelerating switch 17 of Fig. 2. More specifically, when the master switch is moved into engagement with either contact 37 or contact 39 it completes circuit from line $l^2$ to conductor 66 through auxiliary contacts 40 or 42 of main switches 15 and 16 respectively, by conductor 67 through the winding of switch 64, by conductor 68 through the contacts of relay 19, by conductor 69 to line $l$. Then when switch 64 responds it completes circuit from conductor 67 by conductor 70 through its auxiliary contact 65, by conductor 71 through the winding of accelerating switch 17, by conductor 72 to conductor 69 and thence to line $l$. Thus the controller will function precisely as above set forth in connection with Fig. 1 except that the armature circuit will be interrupted as the first step toward obtaining the second speed. In this connection it will be noted that the response of switch 64 is subject to delay by response of relay 19 and that inasmuch as the response of accelerating switch 17 is dependent upon response of switch 64 it will also be dependent upon relay 19, just as in Fig. 1.

Referring now to the modification of the controller shown in Fig. 3, the same embodies the switch 64 of Fig. 2 together with slightly modified control connections whereby three distinct speeds are obtainable by the master switch. Movement of the master switch to first position effects closure of the power circuit and energization of the switch 21 just as in Fig. 1, while its movement to second position energizes switch 64 to interrupt the armature circuit without effecting any other circuit changes and its movement to third position effects response of the accelerating switches 17 and 18 as in Fig. 1.

More specifically describing the modification (Fig. 3) the master switch is provided with a third pair of contacts 73—74 while the switch 64 is provided with auxiliary contacts 75 in addition to the auxiliary contacts 65 (Fig. 2) and the relay 19 has two sets of contacts instead of the single set of Figs. 1 and 2. The energizing circuit for the switch 64 is precisely the same as illustrated in Fig. 2 the same including the upper contacts of relay 19 but in this instance said switch is provided with a maintaining circuit which is completed upon its response by its auxiliary contact 75. As will be apparent, contacts 75 parallel the upper contacts of relay 19 whereby switch 64 after response is rendered independent of subsequent response of relay 19. The energizing circuit of switch 17 is in this instance traced able from the additional pair of contacts 73—74 of the master switch, by conductor 76 through the auxiliary contact 65 of switch 64, by conductor 77 through the lower set of contacts of relay 19, by conductor 78 through the winding of said switch 17 and thence direct to line *l* as in the previous views. As will be understood the switch 17 and the switch 18, function the same as in Fig. 1 and it should be noted in this connection that while the second speed is obtained solely by D. C. regulation this step of regulation is dependent upon the electrical conditions in the rotor circuit.

Referring now to Fig. 4, the same illustrates control means for the mechanical brake 25 (Fig. 1) whereby when the machine has an overhauling load the setting of said brake will be delayed until the machine is brought substantially to rest by its electro-dynamic braking action. As in Fig. 1, the brake is provided with an alternating current magnet 26 for releasing the same upon connection of the machine to its source of power and in addition is provided with a direct current magnet 80 connected in series with the armature of the machine. The magnet 80 being thus connected, will be energized so long as the machine is generating current and hence it may be readily designed to hold the mechanical brake against setting for the desired period after the alternating current magnet 26 is disconnected from circuit. Also, as will be apparent from Fig. 5, a shunt or compound magnet might be substituted for the series magnet 80.

Referring to Fig. 5, the same shows the mechanical brake 25 as provided with an alternating current magnet 26 as in Fig. 1, and an additional alternating current holding magnet 81 controllable by a relay 82. As shown, the relay is provided with a compound coil 83, one section thereof being connected in series in the armature circuit and the other across the armature circuit. The relay is normally open to disconnect the brake magnet 81 from circuit, whereas it is responsive to complete the circuit of said magnet. Thus the magnet 81 under the control of relay 82 will in this instance function in the same manner as the magnet 80 of Fig. 4 to delay application of the mechanical brake in the event of overhauling loads until the motor is substantially brought to rest by its own dynamic braking action.

While several modifications have been herein set forth, it should be understood that no attempt has been made to illustrate all possible modifications falling within the scope of the appended claims.

What I claim as new and desire to secure by Letters Patent is:

1. The combination with a dynamo electric machine having windings providing an alternating current stator and rotor and a direct current field and armature, of alternating current regulating means, direct current regulating means, and electro-responsive means governing said two former means to insure operation thereof in a definite relation to control the machine for mechanical duty.

2. In a controller for a dynamo electric machine having windings providing an alternating current stator and rotor and a direct current field and armature, in combination, alternating current regulating means, direct current regulating means and electro-responsive means governing said two former means to insure operation thereof and in a definite relation and jointly for certain speed variations of the machine.

3. In a controller for a dynamo electric machine having windings providing an alternating current stator and rotor and a direct current field and armature, in combination, alternating current regulating means, direct current regulating means and electro-responsive means governing said two former means to effect variation of the speed of the machine by substantially simultaneous operation of said two means.

4. The combination with a dynamo electric machine having windings providing an alternating current stator and rotor and a direct current field and armature, of alternating current regulating means, direct current regulating means, electro-responsive controlling means for said two former means to insure operation thereof in a definite relation including automatic means for timing certain operations of both said regulating means in accordance with the electrical condition of said alternating current elements.

5. The combination with a dynamo electric machine having windings providing an alternating current stator and rotor and a direct current field and armature, of alternating current regulating means, direct current regulating means, electro-responsive means to direct operation of said two former means including automatic means common to said two regulating means to time certain operations thereof.

6. In a controller for an alternating and direct current machine of the character set forth, in combination, alternating current regulating means, direct current regulating means, and automatic means for timing the operation of both of said regulating means in accordance with the electrical conditions of the controlled machine.

7. In a controller for an alternating and direct current machine of the character set forth, in combination, alternating current regulating means to control the machine as an induction motor, direct current regulating means to vary the electrical load on the machine, controlling means for said two former means to insure their operation in a definite relation and means rendering the operation of both of said regulating means dependent upon the alternating current conditions of the machine.

8. The combination with a dynamo electric machine having windings providing an alternating current stator and rotor and a direct current field and armature, of alternating current regulating means, direct current regulating means, a power controlled mechanical brake and electro-responsive governing means for all of said former means to insure operation thereof in a definite relation.

9. In a controller for an alternating and direct current machine operable as an induction motor to generate direct current, in combination, alternating current regulating means to vary the speed of the machine, direct current regulating means to vary the electrical load on the machine, controlling means for said former two means to insure their operation in a definite relation and a mechanical brake for the machine having automatic controlling means for timing its operation in accordance with both the alternating and direct current conditions of said machine.

10. The combination with a dynamo-electric machine having an alternating current stator and rotor and a direct current field and armature, of means to connect said machine to a source of alternating current for starting, a mechanical brake, an alternating current control winding for said brake controlled by said means, and a direct current control winding for said brake connected in the armature circuit of said machine to delay the setting of said brake during dynamic braking action of said machine.

11. The combination with a dynamo electric machine having an alternating current stator and rotor and a direct current field and armature, of electro-responsive means controlling the rotor circuit of said machine to vary its speed and electro-responsive means controlling the direct current load on said machine, one of said means being governed by the other.

12. The combination with a dynamo electric machine having an alternating current stator and rotor and a direct current field and armature, of electro-responsive means governing the rotor circuit of said machine to vary its speed, electro-responsive means controlling the direct current load on said machine and electro-responsive means responsive to the rotor current to govern the operation of both of said former means.

13. The combination with a dynamo-electric machine having an alternating current stator and rotor and a direct current field and armature, of electro-responsive regulating means for one of the alternating current elements of said machine, other electro-responsive regulating means for one of the direct current elements of said machine and a master switch and connections for effecting joint response of said means for a predetermined speed of said machine.

14. The combination with a dynamo electric machine having windings providing an alternating current stator and rotor and a direct current field and armature, of means controlling the supply of alternating current to said machine, field regulating means and armature regulating means for said machine and electro-responsive means controlling one of said direct current elements and in turn controlled by said first mentioned means.

15. The combination with a dynamo electric machine having windings providing an alternating current stator and rotor and a direct current field and armature, of means controlling the supply of alternating current to said machine, field regulating means, and a resistance for the armature circuit of said machine and an electro-responsive switch controlled by said last mentioned means to include and exclude said resistance.

16. The combination with a dynamo-electric machine having an alternating current stator and rotor and a direct current field and armature, of means controlling the rotor circuit of said machine to regulate its speed and means controlled by said former means to vary the strength of the direct current field of said machine.

17. The combination with a dynamo-electric machine having an alternating current stator and rotor and a direct current field and armature, of means controlling the continuity of the stator circuit of said machine, means controlling the rotor circuit of said machine, means controlling the strength of the direct current field of said machine, means for regulating the resistance of the armature circuit of said machine and controlling means for all of the aforesaid means to insure functioning thereof in a definite relation.

18. The combination with a dynamo-electric machine having an alternating current stator and rotor and a direct current field and armature, of means controlling the rotor circuit of said machine to regulate its speed and means controlled by said former means to vary the strength of the direct current field of said machine and joint functioning of certain of said means for predetermined speed variations.

In witness whereof, I have hereunto subscribed my name.

ARTHUR SIMON.